(12) United States Patent
Wang et al.

(10) Patent No.: US 8,060,608 B2
(45) Date of Patent: *Nov. 15, 2011

(54) REFINED QUALITY FEEDBACK IN STREAMING SERVICES

(75) Inventors: Ye-Kui Wang, Tampere (FI); Igor Curcio, Tampere (FI); Emre Aksu, Tampere (FI); Miska Hannuksela, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 12/799,656

(22) Filed: Apr. 29, 2010

(65) Prior Publication Data

US 2010/0215339 A1  Aug. 26, 2010

Related U.S. Application Data

(63) Continuation of application No. 12/080,494, filed on Apr. 2, 2008, now Pat. No. 7,743,141, which is a continuation of application No. 10/841,228, filed on May 7, 2004.

(51) Int. Cl.
*G06F 15/173* (2006.01)

(52) U.S. Cl. ............ 709/224; 709/223; 370/395.1; 370/252; 370/352; 386/46; 386/125

(58) Field of Classification Search .......... 709/223–224; 370/395.21, 252, 352; 386/46, 125
See application file for complete search history.

(56) References Cited

U.S. PATENT DOCUMENTS

| | | | |
|---|---|---|---|
| 5,459,782 A * | 10/1995 | Volejnik | 375/372 |
| 5,493,584 A | 2/1996 | Emeott | |
| 5,533,021 A | 7/1996 | Branstad et al. | |
| 5,652,749 A | 7/1997 | Davenport et al. | |
| 6,259,677 B1 | 7/2001 | Jain | |
| 6,658,027 B1 * | 12/2003 | Kramer et al. | 370/516 |
| 6,785,353 B1 | 8/2004 | Zakrzewski | |
| 6,792,470 B2 * | 9/2004 | Hakenberg et al. | 709/232 |
| 6,856,601 B1 * | 2/2005 | Bell et al. | 370/252 |
| 6,981,184 B2 | 12/2005 | Morgan et al. | |
| 7,038,710 B2 | 5/2006 | Caviedes | |
| 7,047,308 B2 * | 5/2006 | Deshpande | 709/232 |
| 7,143,432 B1 | 11/2006 | Brooks et al. | |
| 7,185,084 B2 * | 2/2007 | Sirivara et al. | 709/224 |
| 7,286,652 B1 | 10/2007 | Azriel et al. | |
| 7,738,390 B2 | 6/2010 | Rey et al. | |

(Continued)

OTHER PUBLICATIONS

"One Method of Qos Function Tests for a Multi-Media System," Tao Sun et al., Information Processing Society Journal, The Information Processing Society of Japan, Feb. 15, 2004, vol. 45, No. 2, pp. 475-486, English Abstract Only (12 pages).

(Continued)

*Primary Examiner* — Alina N. Boutah

(57) ABSTRACT

A method for quality feedback in a streaming service is shown, wherein at least one media stream is streamed to a client for playback, the method comprising determining a quality feedback value according to at least one quality metric from a pre-defined set of quality metrics, wherein the pre-defined set of quality metrics contains a quality metric related to at least one of the playback of the at least one media stream and a corruption of one out of at least two types of frames contained in the at least one media stream, and reporting the quality feedback value to a server. A system, a client, a server, a computer program, a computer program product and a protocol for quality feedback are also shown.

26 Claims, 4 Drawing Sheets

U.S. PATENT DOCUMENTS

| | | | |
|---|---|---|---|
| 2002/0024974 | A1 | 2/2002 | Karagiannis et al. |
| 2002/0071485 | A1 | 6/2002 | Caglar et al. |
| 2002/0080719 | A1 | 6/2002 | Parkvall et al. |
| 2002/0178330 | A1 | 11/2002 | Schlowsky-Fischer et al. |
| 2003/0039212 | A1 | 2/2003 | Lloyd et al. |
| 2003/0046384 | A1 | 3/2003 | Sirivara et al. |
| 2003/0154217 | A1 | 8/2003 | Kinno et al. |
| 2004/0058652 | A1* | 3/2004 | McGregor et al. ......... 455/67.13 |
| 2004/0114673 | A1* | 6/2004 | Panchal et al. ................ 375/148 |
| 2004/0139462 | A1 | 7/2004 | Hannuksela et al. |
| 2004/0156397 | A1* | 8/2004 | Heikkinen et al. ............ 370/516 |
| 2004/0156624 | A1* | 8/2004 | Kent et al. ..................... 386/125 |
| 2004/0170163 | A1* | 9/2004 | Yik et al. ....................... 370/389 |
| 2004/0252700 | A1 | 12/2004 | Anandakumar et al. |
| 2004/0252701 | A1 | 12/2004 | Anandakumar et al. |
| 2005/0010462 | A1* | 1/2005 | Dausch et al. ..................... 705/8 |
| 2005/0069031 | A1* | 3/2005 | Sunter et al. .................. 375/224 |
| 2005/0076113 | A1 | 4/2005 | Klotz et al. |
| 2005/0089043 | A1* | 4/2005 | Seckin et al. ............ 370/395.21 |
| 2005/0089092 | A1* | 4/2005 | Hashimoto et al. ...... 375/240.03 |
| 2005/0163047 | A1* | 7/2005 | McGregor et al. ............ 370/229 |
| 2006/0069799 | A1* | 3/2006 | Hundscheidt et al. ........ 709/232 |
| 2006/0179154 | A1 | 8/2006 | Sitaraman et al. |
| 2006/0206617 | A1* | 9/2006 | Rey et al. ...................... 709/231 |
| 2006/0282542 | A1 | 12/2006 | Pinckney et al. |
| 2007/0005804 | A1* | 1/2007 | Rideout ......................... 709/246 |
| 2007/0030821 | A1* | 2/2007 | Iwamura et al. .............. 370/328 |
| 2007/0133403 | A1 | 6/2007 | Hepworth et al. |
| 2007/0189398 | A1 | 8/2007 | Hannuksela et al. |
| 2008/0215704 | A1* | 9/2008 | Curcio et al. ................. 709/217 |

OTHER PUBLICATIONS

"SDP: Session Description Protocol," M. Handley et al., ISI/LBNL, Apr. 1998, Networking Group, Request for Comments: 2327, Category: Standards Track; pp. 1-35 (35 pages).

"Draft Rel-6 PSS Quality Metrics Permanent Document," Tdoc S4-040073, 3GPP TSG-SA4 Meeting #30, Feb. 23-27, 2004 (21 pages).

"3rd Generation Partnership Project; Technical Specification Group Services and System Aspects; Transparent end-to-end packet switched streaming service (PSS), General description (Release 5)," 3GPP TS 26.233, V5.0.0, Mar. 2002 (12 pages).

3rd Generation Partnership Project; Technical Specification Group Services and System Aspects; Transparent end-to-end packet switched streaming service (PSS), Protocols and codecs (Release 5); 3GPP TS 26.234, V5.6.0, Sep. 2003 (86 pages).

"Advanced Video Coding for Generic Audiovisual Services," ITU-T, H.264, Series H: Audiovisual and Multimedia Systems, Infrastructure of audiovisual services—Coding of moving video, May 2003 (271 pages).

"SNMP Counter for Distributed Monitoring of MPEG Video Quality," Shahbazian et al, Electronics Letters, vol. 39, No. 1, Jan. 9, 2003 (2 pages).

Scalable Proxy Caching of Video Under Storage Constraints,: Miao et al, IEEE Journal on Selected Areas in Communications, vol. 20, No. 7, Sep. 7, 2002 (14 pages).

Japanese Publication No. 2004-048565, published Dec. 2, 2004, Takayuki et al., (NTT) (61 pages total including 1 page English Abstract, 40 pages original document and 20 pages machine translation).

Japanese Publication No. 11-215481, published Jun. 8, 1999. Mayumbi et al., (Fujitsu) (32 pages total including 1 page English Abstract, 13 pages original document and 18 pages machine translation).

Feng, Wu-Chi, "On the efficacy of quality, frame rate, and buffer management for video streaming across best-effort networks," Journal of High Speed Networks 11 (2002), pp. 199-214.

Wijesekera et al, "Quality of Service (QoS) Metrics for Continuous Media," 1996, Multimedia Tools and Applications, pp. 127-166.

* cited by examiner

```
Feedbackheader = "QoE-Feedback" ":"
1#(stream-url 1* (parameters) [";" Range] CRLF)
stream-url = "url" "=" rtsp_URL
parameters = ";" Metrics "="
"{" SP / 1#(Value [SP Timestamp]) "}"
Metrics = *TEXT
Value = 1*DIGIT ["." *DIGIT]
Timestamp = 1*DIGIT
Range = as defined in IETF RFC 2327
DIGIT = as defined in IETF RFC 2327
Rtsp_URL = as defined in IETF RFC 2327
SP = as defined in IETF RFC 2327
```

Fig. 2  Prior Art

REFINED QUALITY FEEDBACK IN STREAMING SERVICES

CROSS-REFERENCE TO RELATED APPLICATION

This application is a continuation of U.S. application Ser. No. 12/080,494 filed Apr. 2, 2008 now U.S. Pat. No. 7,743,414; which application is a continuation of U.S. application Ser. No. 10/841,228 filed May 7, 2004.

FIELD OF THE INVENTION

This invention relates to a method, a computer program, a computer program product, a system, a client, a server and a protocol for quality feedback in a streaming service, wherein at least one media stream is streamed to a client for playback.

BACKGROUND OF THE INVENTION

Streaming, on the one hand, refers to the ability of an application settled in a client to play back synchronized media streams like speech, audio and video streams in a continuous way while those streams are being transmitted to the client over a data network. On the other hand, streaming also refers to real-time low-delay applications such as conversational applications.

Applications that can be built on top of streaming services can be classified into on-demand and live information delivery applications. Examples of the first category are music and news-on-demand applications. Live delivery of radio and television programs are examples of the second category. Real-time low delay application are, for example, multimedia (video)telephony or Voice over IP and any type of conversational multimedia application.

Streaming over fixed Internet Protocol (IP) networks is already a major application today. While the Internet Engineering Task Force (IETF) and the World Wide Web Consortium (W3C) have developed a set of protocols used in fixed-IP streaming services, no complete standardized streaming framework has yet been defined. For Third Generation (3G) mobile communications systems according to the standards developed by the Third Generation Partnership Project (3GPP), the 3G Packet-switched Streaming Service (PSS, 3GPP TS 26.233, TS 26.234) fills the gap between the 3G Multi-media Messaging Service (MMS), for instance downloading applications and multimedia content, and conversational & streaming services.

The PSS enables mobile streaming applications, wherein the complexity of the terminals is lower than that required for conversational services, because no media input devices and encoders are required, and because less complex protocols can be used. The PSS includes a basic set of streaming control protocols, transport protocols, media codecs and scene description protocols.

FIG. 1 schematically depicts the PSS protocol stack 1 that controls the transfer of both streamable and non-streamable content between a content or media server and a client.

Streamable content 101, such as video, audio and speech, is first converted to the payload format of the Real-time Transport Protocol (RTP) 102 in an adaptation layer 103. Said RTP as defined by the IETF provides means for sending real-time or streaming data by using the services of an underlying User Datagram Protocol (UDP) 104, which in turn uses the services of an underlying IP protocol 105.

Non-streamable content 106, as for instance multimedia content which is not created for streaming purposes (e.g. MMS clips recorded on a terminal device), still images, bitmap and vector graphics, text, timed text and synthetic audio are transferred by the Hypertext Transfer Protocol (HTTP) 107, which uses the services of the underlying Transport Control Protocol (TCP) 108 and the further underlying IP 105.

Whereas for the non-streamable content 106, the built-in session set-up and control capabilities of the HTTP 107 are sufficient to transfer the content, in case of streamable content 101, an advanced session set-up and control protocol has to be invoked, for instance to start, stop and pause a streaming video that is transferred from the content server to the client via the RTP/UDP/IP. This task is performed by the Real-time Streaming Protocol (RTSP) 109, which may either use the underlying TCP 108 or the underlying UDP 104. RTSP requires a presentation description 110 at least to set-up a streaming session. Such a presentation description 110 may for instance be available in the form of a Session Description Protocol (SDP) file. Said SDP file contains the description of the session, for instance session name and author, the type of media to be presented, information to receive said media, as for instance addresses, ports, formats and so on, and the bitrate of the media.

If streaming content is to be viewed at the client side, for instance at a mobile terminal, the user of said terminal is first provided with a Universal Resource Identifier (URI) to specific content that suits his terminal. This URI may come form a WWW server, a Wireless Application Protocol (WAP) server, or may have been entered manually via the keyboard of the terminal. This URI specifies a streaming or RTSP server and the address of the content on that or another content server. The corresponding SDP file may now be obtained in a number of ways. It may be provided in a link inside the HTML page that the user downloads, for instance via an embed tag, or may also be directly obtained by typing it as a URI. The SDP file, i.e. the presentation description 110, then is transferred via the HTTP 107 as indicated in the middle column of the protocol stack of FIG. 1. Alternatively, it may also be obtained through RTSP 109 signaling, for instance by using the DESCRIBE method of the RTSP 109, as indicated by the right column of the protocol stack in FIG. 1. Note that the presentation description may equally well be transmitted by said RTP 102. However, for simplicity of presentation, this possibility was not included in FIG. 1.

The subsequent session establishment is the process in which the browser or the user of the mobile terminal invokes a streaming client to set up the session against the content server. The terminal is expected to have an active radio bearer that enables IP-based packet transmission at the start of session establishment signaling.

The subsequent set-up of the streaming service is done by sending an RTSP SETUP message for each media stream chosen by the client. This returns the UDP 104 and/or TCP 108 port to be used for the respective media stream. The client sends an RTSP PLAY message to the content server that then starts to send one or more streams over the IP network.

In order to offer service providers in PSS systems means to evaluate the end user streaming experience, streaming service quality metrics have been introduced in PSS systems, as presented in 3GPP Technical document (Tdoc) S4-040073: "Draft Rel-6 PSS Quality Metrics Permanent Document v.0.11", which refers to 3GPP TSG-SA4 meeting #30 in Malaga, Spain, Feb. 23-27, 2004. The streaming client measures and feeds back information on the quality of the actual streaming application (Quality of Experience, QoE) to a streaming server, wherein said quality is defined in terms of said quality metrics. Said streaming server may for instance be an RTSP server, and said quality metrics may for instance be transported by using said RTSP and SDP.

Because the service is transparent to the type of RAN and CN, only the streaming client and the streaming server are impacted by the PSS quality metrics. One consequence of this is that the measurements may not rely on information from protocol layers below the RTP layer (e.g. UDP, IP, PDCP, SNDCP, LLC, RLC, MAC, Physical Layer).

The terminal in a PSS system with quality feedback is responsible to perform the quality measurements in accordance to the measurement definition, aggregate them into streaming client quality metrics and report the metrics to the streaming server. This requirement does not preclude the possibility for the streaming client to report raw quality measurements to be processed by the streaming server into quality metrics.

The streaming server is responsible to signal the activation of the streaming client's quality metrics reporting and to gather the streaming client's quality metrics. The streaming server may process the received streaming client's quality metrics to build aggregated quality metrics. E.g. it could receive a raw lost packets report and build the Min, Max, Avg and Std packet loss rate for a particular streaming client.

The following four quality metrics are defined by Tdoc S4-040073:

Corruption Duration

Corruption duration is the time period from the first corrupted frame to the first subsequent good frame or the end of the reporting period (whichever is sooner). The unit of this metrics is expressed in seconds, and can be a fractional value.

Rebuffering Duration

This metric is only applicable for audio, video and speech, and is not applicable to other media types. The unit of this metrics is expressed in seconds, and can be a fractional value. Rebuffering is defined as any stall in playback time due to any involuntary event at the client side.

Initial Buffering Time

Initial buffering is the time from receiving the first RTP packet until playback starts. The unit of this metrics is expressed in seconds, and can be a fractional value.

Number of Content Packets Lost in Succession

The number of content packets lost in succession per media channel.

The objective of the above quality metric definition is to obtain consistent measurements across content type, terminals, and types of Radio Access Network (RAN).

The constraints are to minimize the size of the quality metrics report that will be sent to the streaming server and, the complexity for the terminal.

The actual quality metrics feedback can be conveyed to the PSS server by using the SET_PARAMETER method of the RTSP with a feedback header 2 as depicted in FIG. 2 (with reference to IETF Request for Comments (RFC) document 2327), however, in particular cases, it is more efficient to use other methods to carry the information, as for instance the TEARDOWN message or the PAUSE message.

In the feedback header 2 of FIG. 2, Stream-url is the RTSP session or media control URL identifier for the feedback parameter. The Metrics field in the Parameters definition contains the name of the metrics/measurements (for instance corruption duration, etc.). The Value field indicates the results. There is the possibility that the same event occurs more than once during a monitoring period. In that case the metrics value can occur more than once, which indicates the number of events to the server. The optional Range field indicates the reporting period.

The optional Timestamp field in the feedback header 2 of FIG. 2 indicates the time when the event (or measurement) occurred or when the metric was calculated since the beginning of the session.

The four quality metrics defined by Tdoc S4-040073 only allow for a coarse characterization of the quality of the playback of multimedia streams as experienced by a user. For instance, if two streaming sessions have the same values of the four quality metrics defined by Tdoc S4-040073, and if in the first of said sessions, a perfect synchronization between audio and video data exists, whereas in the second of said sessions, said synchronization between audio and video has been lost, the reported quality based on the four quality metrics defined by Tdoc S4-040073 is the same while the actually experienced quality of playback is quite different. Furthermore, the four quality metrics defined by Tdoc 54-040073 do not differentiate between the different frame types contained in said multimedia stream, so that, for instance, the loss of frame types that are of crucial importance for the experienced quality of the playback can not be differentiated from the loss of less important types of frames when reporting quality.

SUMMARY OF THE INVENTION

In view of the above-mentioned problems, it is, inter alia, an object of the present invention to provide a method, a computer program, a computer program product, a system, a client, a server and a protocol that allow for a refined quality feedback in a streaming service.

A method for quality feedback in a streaming service is proposed, wherein at least one media stream is streamed to a client for playback, said method comprising determining a quality feedback value according to at least one quality metric from a pre-defined set of quality metrics, wherein said pre-defined set of quality metrics contains a quality metric related to at least one of said playback of said at least one media stream and a corruption of one out of at least two types of frames contained in said at least one media stream, and reporting said quality feedback value to a server.

Said at least one media stream may for instance be a continuous media stream that may contain video, audio or speech information that is continuously transmitted from a server, for instance a content server, to said client and is played back on the terminal, in which said client is set up, in a synchronized manner. Alternatively, said at least one media stream may be a media stream of a real-time low delay application, as for example a multimedia (video) telephony stream or a Voice-over-IP media stream or any type of media stream in a conversational multimedia application. This streaming may take place in a streaming session, wherein several media streams may be concurrently streamed to said client. Said streaming may be based on a protocol, for instance the Real-time Transport Protocol RTP, and may be controlled by a further protocol, for instance a streaming protocol as the Real-time Streaming Protocol RTSP or the Session Initiation Protocol SIP, and may for instance allow to start, stop and/or pause the streaming. Said RTSP or SIP may be operated by protocol entities in said client and in said server and may be based on a Session Description Protocol SDP. Said server may be co-located or even be identical with the content server from which said media actually stems from, or may be a different instance.

The quality of said streaming is determined at the client site according to said at least one quality metric from said pre-defined set of quality metrics, and reported as a quality feedback value, for instance via said protocol that the streaming is based on or said protocol that controls the streaming. Said quality metric basically defines how said quality feedback value is calculated. Said pre-defined set of quality metrics may be defined by said protocol that controls the streaming, and said at least one quality metric, may be negotiated between said client and said server before, during or even after the set-up of the session.

Said quality feedback value is reported to said server, for instance via said protocol the streaming is based on or via said protocol that controls the streaming. If said protocol that controls said streaming is an RTCP or SIP, it may be preferred that said reported quality feedback values are captured or sniffed by an entity, for instance a network entity such as a Call State Control Function CSCF, in order to make quality measurements.

According to the present invention, to refine quality feedback, said pre-defined set of quality metrics contains a quality metric related to said playback of said at least one media stream, and/or a quality metric related to a corruption of one out of at least two types of frames contained in said at least one media stream. Said quality metric related to said playback of said at least one media stream may for instance relate to a deviation of the actual playback frame rate of said playback from a pre-defined value, or to a difference between the actual playback time and a scheduled playback time, or to a loss of synchronization between the playback of audio or speech frames and the corresponding video frames. Said quality metric related to a corruption of one out of at least two types of frames contained in said at least one media stream may for instance relate to a corruption of scene cut frames of a video stream that may be essential for the experienced quality of the playback.

The incorporation of quality metrics related to playback and/or the corruption of specific types of frames according to the present invention thus allows for a refinement of quality feedback.

According to a preferred embodiment of the present invention, said quality metric related to said playback of said at least one media stream is a frame-rate-deviation metric that is related to a deviation of a playback frame rate of said playback of said at least one media stream from a pre-defined value. When playing back said at least one media stream, which may be composed of a sequence of frames, a frame rate with which said frames are played back may not equal a frame rate that is desired or optimum for said playback. It is thus instructive to report such as deviation. Said pre-defined value may be a default value known by both the server and the client, or only by one of the two. Said pre-defined value may for instance be an optimum playback frame rate. Said frame-rate-deviation metric may further be related to a duration of said deviation event.

According to a preferred embodiment of the present invention, said quality metric related to said playback of said at least one media stream is a jitter-duration metric that is related to a duration of a jitter event that occurs when a difference between a playback time of said playback of said at least one media stream and a scheduled playback time is larger than a pre-defined value. Said pre-defined value may be a default value known by both the server and the client, or only by one of the two. Said playback time denotes the actual playback time, which may for instance be measured in Normal Play Time (NPT) or any other time system at the client, e.g. wall-clock time. Different time systems may have different origins (with the value 0) and units. Each media frame is associated with a scheduled playback time, which may for instance be-signaled using Real-Time Transmission Protocol (RTP) timestamps. However, due to reasons such as network delay, a media frame might not be played back exactly at the scheduled playback time, so that playback time and scheduled playback time differ.

According to a preferred embodiment of the present invention, said quality metric related to said playback of said at least one media stream is a synchronization-loss-duration metric that is related to a duration of a synchronization loss event that occurs when the absolute difference between a value A and a value B is larger than a pre-defined value, wherein said value A is a difference between a playback time of a last played frame of a first media stream of said at least one media streams and a playback time of a last played frame of a second media stream of said at least one media streams, and wherein said value B is a difference between a scheduled playback time of said last played frame of said first media stream of said at least one media streams and a scheduled playback time of said last played frame of said second media stream of said at least one media streams. Said first media stream may for instance be an audio or speech stream, and said second media stream may for instance be a video stream. If playback refers to the synchronous playback of video and speech/audio streams, a lack of synchronization of images and corresponding speech/audio may be experienced as annoying by a user and thus is important to be reported to said server. Said pre-defined value may be a default value known by both the server and the client, or only by one of the two.

According to a preferred embodiment of the present invention, one out of said at least two types of frames contained in said at least one media stream is a scene cut frame, and said quality metric related to a corruption of one out of at least two types of frames contained in said at least one media stream is a number-of-corrupted-scene-cut-frames metric that is related to a number of corrupted scene cut frames in said at least one media stream. Said other type of frames then may for instance be a normal content frame that is similar as the previous frame in content. It is thus possible to separately report on the corruption of scene cut frames that may be of particular importance for the playback quality. Said scene cut frame may for instance indicate a cut of a scene in a video stream, information related to said scene cut frames may be available at the server or may be derived at the server or the client, and said information may be signaled in-band or out-of-band to the client.

According to a preferred embodiment of the present invention, said quality metric is reported together with a timestamp. Said timestamp may for instance indicate an absolute or relative time instance of an occurrence of an event that is described according to said quality metric.

According to a preferred embodiment of the present invention, said frame-rate-deviation metric is reported together with a timestamp, and said timestamp is equal to a play time of a first played frame during said deviation relative to a starting time of a quality reporting period. Said play time may for instance be represented as NPT.

According to a preferred embodiment of the present invention, said jitter-duration metric is reported together with a timestamp, and said timestamp is equal to a play time of a first played frame during said jitter event relative to a starting time of a quality reporting period. Said play time may for instance be represented as NPT.

According to a preferred embodiment of the present invention, said synchronization-loss-duration metric is reported together with a timestamp, and said timestamp is equal to a play time of a first played frame during said synchronization loss event relative to a starting time of a quality reporting period. Said play time may for instance be represented as NPT.

According to a preferred embodiment of the present invention, said play time is a Normal Play Time NPT. Said NPT may for instance be provided by a Real-Time Streaming Protocol RTSP. Defining said play time via the NPT removes ambiguities in the interpretation of timestamps by clients and servers and thus allows for a correct analysis of streaming quality experiences.

According to a preferred embodiment of the present invention, said pre-defined set of quality metrics contains a corruption-duration metric that is related to a duration of a corruption, and said quality feedback value determined according to said corruption-duration metric is only reported if said duration is larger than a pre-defined value. During playback, if only a single frame or a few frames in a short time period are not played back, the end user typically cannot perceive the difference. The receiving terminal may decide not to play back a frame for instance due to one of the following reasons: Due to any reason, a non-reference frame has not been transmitted from the server; a non-reference frame is partially or entirely lost; a non-reference frame is completely received, but it cannot be correctly decoded; a non-reference frame is completely received, but due to delay or lacking of computing capability, it is not decoded; a reference or non-reference frame is completely received and correctly decoded but its scheduled display time has expired. Non-playback of such frames in a short time period does not affect user experience, so that reporting of such frames of a short time period would be a waste of transmission bandwidth. Thus, according to this preferred embodiment of the present invention, it is proposed that a corruption duration is only reported when it exceeds said pre-defined value, which may for instance be a default value set by the server and/or the client or a value prescribed by a protocol.

According to a preferred embodiment of the present invention, said at least one media stream is based on a Real-time Transport Protocol RTP. Said RTP may be operated between said client and a content server and may use the services of a User Datagram Protocol UDP, which in turn may use the services of an Internet Protocol IP.

According to a preferred embodiment of the present invention, said streaming is at least partially controlled by a Real-time Streaming Protocol RTSP. Said RTSP may be based on a presentation description provided by a Session Description Protocol SDP. Said RTSP may be operated by said client and said server and may for instance allow for the starting, pausing and stopping of the streaming.

According to a preferred embodiment of the present invention, said quality feedback value is reported to said server via said RTSP. Said quality feedback value may for instance be contained in a header of an RTSP protocol data unit.

According to a preferred embodiment of the present invention, said streaming service is a Packet-switched Streaming Service PSS in a 3G mobile communications system.

A computer program is further proposed with instructions operable to cause a processor to perform the above-mentioned method steps. Said computer program may for instance be run on a processor in said client.

A computer program product is further proposed comprising a computer program with instructions operable to cause a processor to perform the above-mentioned method steps. Said computer program product may for instance be stored in a computer readable medium or memory, such as a ROM or RAM, or be stored on a removable medium such as a memory card, a memory stick, a disk, a CD or similar media, and may be loaded into the internal memory of a processor that is located in said client.

A system for quality feedback in a streaming service is further proposed, comprising at least one server, and at least one client, wherein at least one media stream is streamed to said at least one client for playback, wherein a quality feedback value is determined according to at least one quality metric from a pre-defined set of quality metrics, wherein said pre-defined set of quality metrics contains a quality metric related to at least one of said playback of said at least one media stream, and a corruption of one out of at least two types of frames contained in said at least one media stream, and wherein said quality feedback value is reported to said at least one server.

A client in a streaming service is further proposed, comprising means for receiving at least one media stream that is streamed to said client for playback, means for determining a quality feedback value according to at least one quality metric from a pre-defined set of quality metrics, wherein said pre-defined set of quality metrics contains a quality metric related to at least one of said playback of said at least one media stream and a corruption of one out of at least two types of frames contained in said at least one media stream, and means for reporting said quality feedback value to a server.

A server in a streaming service is further proposed, wherein at least one media stream is streamed to a client for playback, wherein a quality feedback value is determined according to at least one quality metric from a pre-defined set of quality metrics, wherein said pre-defined set of quality metrics contains a quality metric related to at least one of said playback of said at least one media stream and a corruption of one out of at least two types of frames contained in said at least one media stream, said server comprising means for receiving said quality feedback value that is reported by said client to said server.

A protocol to be used in a streaming service is further proposed, wherein at least one media stream is streamed to a client for playback, the protocol defining a quality metric related to at least one of said playback of said at least one media stream, and a corruption of one out of at least two types of frames contained in said at least one media stream. Said protocol may be an RTSP in combination with a Session Description Protocol SDP.

These and other aspects of the invention will be apparent from and elucidated with reference to the embodiments described hereinafter.

BRIEF DESCRIPTION OF THE FIGURES

In the figures show:

FIG. 2: a definition of a Real-time Streaming Protocol (RTSP) negotiation header according to the prior art.

DETAILED DESCRIPTION OF THE INVENTION

Figure 1:
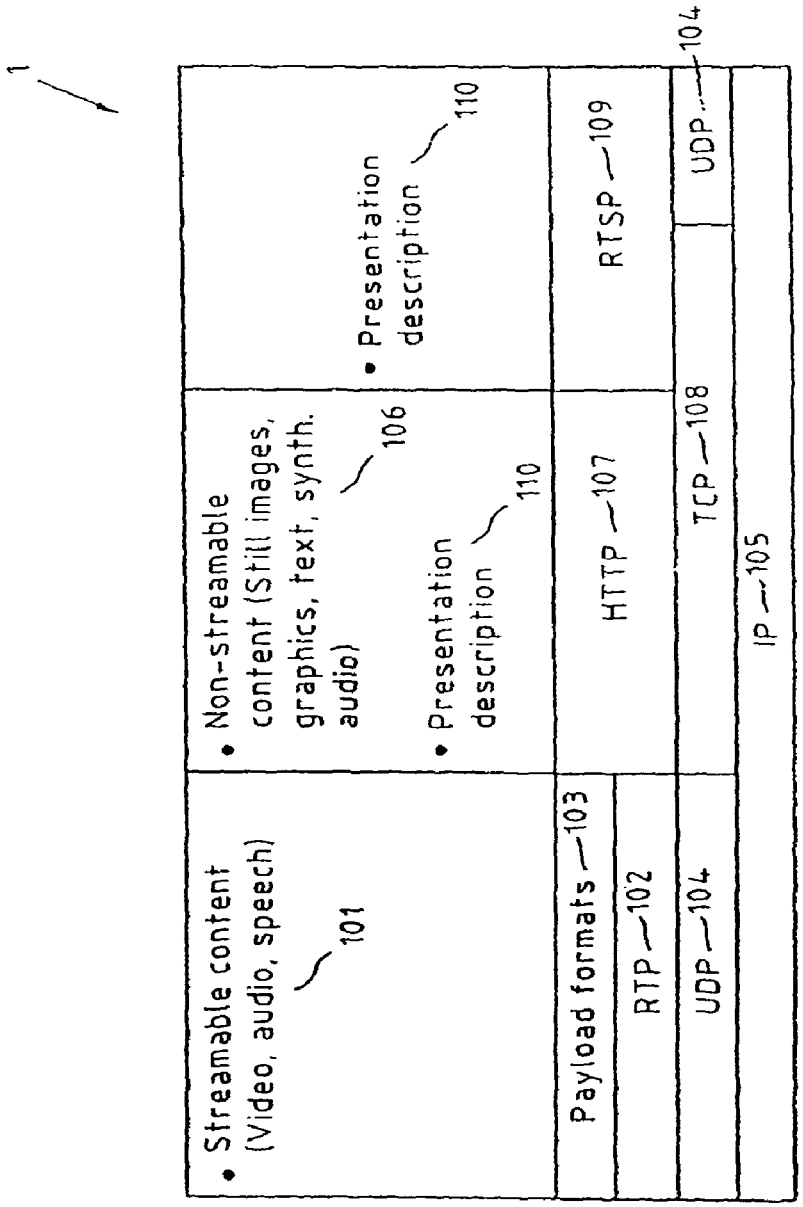
FIG. 1: A schematic representation of a Packet-Switched Streaming Service (PSS) protocol stack according to the prior art.

The present invention proposes special quality metrics to be used in quality feedback for streaming services in order to refine quality feedback. In the following, the proposed quality metrics and their associated timestamps will be described in more detail.

Frame-Rate-Deviation

This quality metric may only be applicable for audio, video and speech, and it may not be applicable to other media types. It gives information on the playback frame rate. Frame rate deviation happens when the playback frame rate deviates from a pre-defined value. This quality metric may contain both the time duration of the event and the frame rate deviation value, i.e. the difference between a pre-defined frame rate and the actual playback frame rate. The time duration may be expressed in units of seconds, and may be a fractional value. The deviation value may be expressed in units of frames per second, and may also be a fractional value.

Said pre-defined value may be a default value known by both the server and the client, or it may be provided by the server during QoE negotiation. If it is to be provided by the server, the server may decide the value by checking the media bitstream or any other means.

It may be advantageous that the value indicates the average frame rate calculated when the media stream is locally played back.

From an implementation point of view, the following method may be specified to calculate the frame rate. It is assumed that the frame rate changes only at integer seconds. The frame rate value of the time period from second n−1 to second n is equal to the number of frames played back during the period. The time axis may represent NPT time and may originate from the starting time of the QoE reporting period.

The timestamp associated with the frame-rate-deviation metric indicates the time when the frame rate deviation has occurred. The value of the timestamp may be equal to the NPT of the first played frame during the frame rate deviation event, relative to the starting time of the QoE reporting period. If there is no played frame during the event, the value may be equal to the NPT of the last played frame before the event or the starting time of the QoE reporting period, whichever is later, relative to the starting time of the QoE reporting period.

Jitter-Duration

This quality metric may be only applicable for audio, video and speech, and may not be applicable to other media types. A playback jitter happens when the absolute difference between the actual playback time and the scheduled playback time is larger than a pre-defined value. This metric may be expressed in units of seconds, and may be a fractional value. Said pre-defined value may be a default value known by both the server and the client, e.g. 100 milliseconds.

The timestamp associated with the jitter-duration metric indicates the time when the playback jitter has occurred. The value of the timestamp may be equal to the NPT of the first played frame in the playback jitter, relative to the starting time of the QoE reporting period.

Synchronization-Loss-Duration

This quality metric may be applicable for any pair of media types. Define a value A as a difference between a playback time of a last played frame of a first media stream of said at least one media streams and a playback time of a last played frame of a second media stream of said at least one media streams, and define a value B as a difference between a scheduled playback time of said last played frame of said first media stream of said at least one media streams and a scheduled playback time of said last played frame of said second media stream of said at least one media stream. A synchronization loss happens when the absolute difference between said value A and said value B is larger than a pre-defined value. This quality metric may be expressed in units of seconds, and may be a fractional value. Said pre-defined value may be a default value known by both the server and the client, e.g. 100 milliseconds.

The timestamp associated with the synchronization-loss-duration metric indicates the time when the playback synchronization loss has occurred. The value of the timestamp may be equal to the NPT of the first played frame in the synchronization loss, relative to the starting time of the QoE reporting period.

Number-of-Corrupted-Scene-Cut-Frames

This quality metric may be only applicable for video, and may not be applicable to other media types. This metric refers to the number of corrupted scene cut frames during the QoE reporting period. This metric may be expressed in units of integers larger than or equal to zero. If this metric is supported, and if no such metric is reported for a QoE reporting period, this may indicate that no scene cut frame has been corrupted during the QoE reporting period.

This quality metric may be used if the server has information indicating which frames are scene cut frames, or if the server implements a method to derive the information, for instance by using a scene cut detection algorithm. In this case, it may be advantageous that the server makes the information available to the client either via in-band or out-of-band signaling. This quality metric may also be used if the client implements a method to derive the information, for instance by using a scene cut detection algorithm. For example, in ITU-T H.264 (a.k.a. ISO/IEC MPEG-4 Part 10), scene cut information can be conveyed to the client in-band using the scene information supplemental enhancement information (SEI) message.

The timestamp associated with the number-of-corrupted-scene-cut-frames metric may not be defined, since it may be clear that the time when the number of corrupted scene cut frames is measured is equal to the ending time of the QoE reporting period.

An example protocol syntax for each of the new quality metrics as proposed by the present invention for instance reads as:

Framerate_Deviation="Framerate_Deviation""=""{"SP/
  (Value1SPValue2[SPTimestamp])#
  (",""Value1SPValue2[SPTimestamp])"}";

Jitter_Duration="Jitter_Duration""=""{"SP/
  Value1SPTimestamp))#(",""Value[SPTimestamp])"}";

Syncloss_Duration="Syncloss_Duration""=""{"SP/
  (Value[SPTimestamp])#(",""Value[SPTimestamp])"}";
Currupted_Scene_Cuts="Corrupted_Scene_
  Cuts""=""{"SP/Value"}";

Therein, the Value1 field indicates the time duration of the frame rate deviation event, and the Value2 field indicates the frame rate deviation value. The Value field indicates the time duration of the playback jitter, the time duration of synchronization loss, or the number of corrupted scene cut frames. The semantics of the Timestamp field are as specified above.

In quality feedback, there exists the possibility that the same event occurs more than once during a monitoring period. In that case, a quality feedback value may occur more than once, which indicates the number of events to the server.

To enable the client to calculate the frame-rate-deviation metric, a pre-defined frame rate value may need to be sent to the client. In this case, the value can be added as one additional parameter to an RSTP header QoE-Header or SDP attribute "QoE-Metrics", as specified in Tdoc S4-040073. The syntax design for the pre-defined frame rate value may, for example, be defined as follows:

Pre-defined Frame
  Rate="FR""="1*DIGIT"."1*DIGIT

The syntaxes of the RTSP QoE-Header and the SDP QoE-Metrics then may become:

```
QoE-Header="QoE-Metrics"":"":"off"/1#(stream-url";
    "Metrics";"Sending-rate[";"Range][";"FR])
    CRLF
``` and

```
a=QoE-Metrics:Metrics";"Sending-rate[";"Range][";
    "FR]CRLF
```

To use transmission bandwidth more efficiently when performing quality feedback in streaming services, the present invention proposes that a quality feedback value determined according to the corruption-duration metric is only reported if said duration is larger than a pre-defined value. During playback, if only a single frame or a few frames in a short time period are not played back, the end user typically cannot perceive the difference. The receiving terminal may decide not to play back a frame for instance due to one of the following reasons: Due to any reason, a non-reference frame has not been transmitted from the server; a non-reference frame is partially or entirely lost; a non-reference frame is completely received, but cannot be correctly decoded; a non-reference frame is completely received, but due to delay or lacking of computing capability, it is not decoded; a reference or non-reference frame is completely received and correctly decoded but its scheduled display time has expired. Non-playback of such frames in a short time period does not affect user experience, so that reporting of such frames of a short time period would be a waste of transmission bandwidth. Thus, according to the present invention, it is proposed that a corruption duration is only reported when it exceeds said pre-defined value, which may for instance be a default value set by the server and/or the client or a value prescribed by a protocol.

Figure 3:
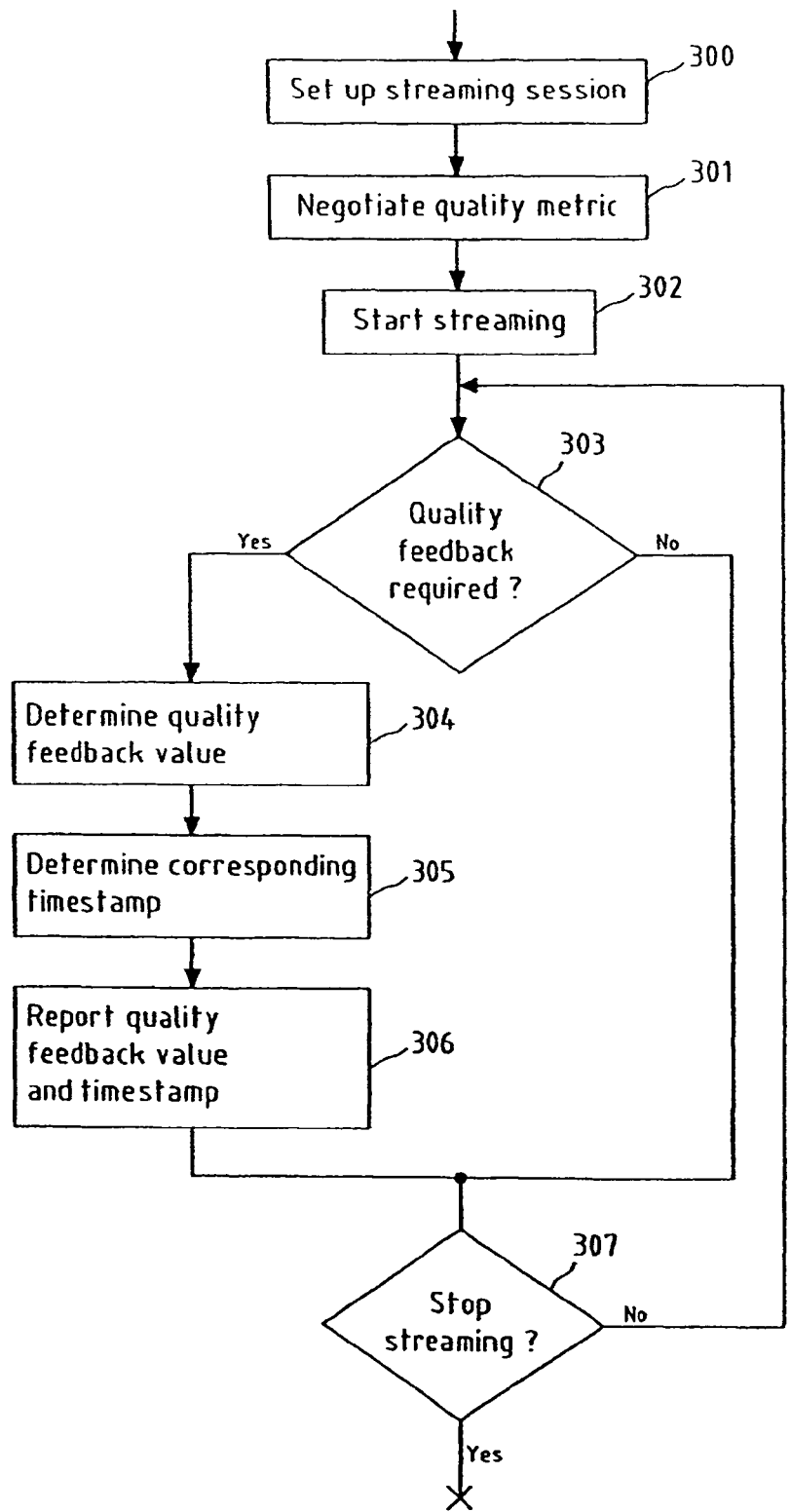
FIG. 3: a flowchart of the method of the present invention.

FIG. 3 depicts a flowchart of a method according to the present invention. In a first step 300, a streaming session is set up between a streaming client and a streaming server. In a step 301, one or more quality metrics from a pre-defined set of quality metrics, which comprises the quality metrics as proposed by the present invention, are negotiated between the streaming client and the streaming server for use in the quality feedback procedure that is performed by the streaming client. Both said session set-up and negotiation may be based on an RTSP in combination with an SDP, or on an RTCP or SIP. Step 301 may also be performed together with step 300. A corresponding timestamp metric may be associated with at least some of the negotiated quality metrics for the streaming session. In a step 302, the actual streaming is started, for instance when a media stream is transmitted to the streaming client and played back on the terminal in which said streaming client is set up. During said streaming, in a step 303, it is checked if a quality feedback is required or not. This may for instance be accomplished by continuously checking if an event, which has to be reported to the streaming server according to the negotiated quality metric, occurs or not. This may for instance be a loss of synchronization event. Alternatively, a periodical quality report may have been negotiated, for instance the periodical feed-back of the number of corrupted scene cut frames in a certain time interval. In said step 303, both the event-driven and the periodical quality feedback is triggered. If it is decided that quality feedback is required, in a step 304, a quality feedback value is determined according to each negotiated quality metric. If one or several of said negotiated quality metrics are associated with a timestamp metric, corresponding timestamps are determined in a step 305. Said step 305 may equally well be performed before the step 304. The quality feedback values and the corresponding timestamps are then reported to the streaming server in a step 306, for instance via the RTSP, RTCP or SIP. After quality feedback, or if it is decided that no quality feedback is required, it is checked in a step 307 if streaming is to be stopped. If this is not the case, it is again checked in a step 303 if a new quality feedback is required or not.

Figure 4:
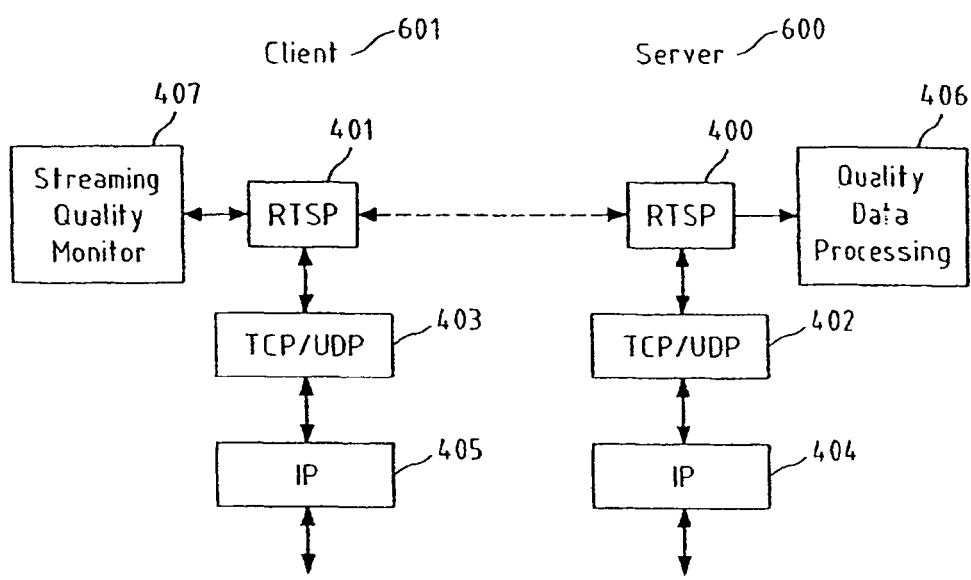
FIG. 4: a schematic representation of a system according to the present invention.

FIG. 4 schematically depicts the functional components of a system according to the present invention. This embodiment exemplarily refers to a PSS system that uses an RTSP to control the streaming. It is understood that equally well, the SIP could be used here with a slightly modified underlying protocol stack and with an additional network instance that sniffs or captures the quality feedbacks and timestamps that are sent from the client 601 (a first party) to the server 600 (a second party). The PSS system in FIG. 4 comprises a streaming client 601 and a streaming server 600, wherein both client 601 and server 600 have at least one RTSP entity 401, 400 that is capable of operating the RTSP. The RTSP entities 400, 401 use the services of underlying protocol layers that are operated by further protocol entities, of which only the TCP/UDP entities 402, 403 and the IP entities 404, 405 are shown. The streaming client 601 is further connected to a streaming quality monitor instance 407, which monitors the quality of the actual streaming application in terms of the negotiated quality metrics and possibly a corresponding timestamp metric and inputs monitored quality feedback values into said RTSP entity 401. Said streaming quality monitor may for instance be provided by the terminal, in which said streaming client is set up. If a timestamp metric is defined for the used quality metric, the streaming quality monitor 407 then determines a timestamp according to said timestamp metric, and transfers said monitored quality feedback values and said corresponding timestamps, via the client RTSP 401, to the RTSP peer entity in the streaming server 600, where they are input into a quality data processing instance 406 for evaluation and analysis, which may for instance aim at improving the quality of the streaming application by enhancing the error resilience of the streams if it is found that the corruption duration events become too frequent, or just aim at statistical quality data collection or charging or other aims.

The invention has been described above by means of a preferred embodiment. It should be noted that there are alternative ways and variations which are obvious to a skilled person in the art and can be implemented without deviating from the scope and spirit of the appended claims. In particular, the present invention is by no means restricted to application in 3G radio communications systems. It may equally well be deployed in all kinds of wired and wireless data transmission systems with parameter feedback.

The invention claimed is:

1. A method comprising:
   determining a difference between a playback time of a playback of at least one media stream streamed to a client for playback and a scheduled playback time;
   comparing said difference between said playback time of said playback of said at least one media stream and said scheduled playback time to a pre-defined value;
   detecting a jitter event that is considered to occur when said comparing said difference between said playback time of said playback of said at least one media stream and said scheduled playback time to said pre-defined value yields that said difference is larger than said pre-defined value;
   determining a quality feedback value according to at least one quality metric related to said playback of said at least one media stream, said quality metric being a jitter-duration metric that is related to a duration of said detected jitter event; and reporting said quality feedback value to a server.

2. The method according to claim 1, wherein said jitter-duration metric is contained in a pre-defined set of quality metrics that further contains a frame-rate-deviation metric that is related to a deviation of a playback frame rate of said playback of said at least one media stream from a pre-defined value.

3. The method according to claim 2, wherein said frame-rate-deviation metric further is related to a duration of said deviation.

4. The method according to claim 1, wherein said jitter-duration metric is contained in a pre-defined set of quality metrics that further contains a synchronization-loss-duration metric that is related to a duration of a synchronization loss event that occurs when the absolute difference between a value A and a value B is larger than a pre-defined value, wherein said value A is a difference between a playback time of a last played frame of a first media stream of said at least one media streams and a playback time of a last played frame of a second media stream of said at least one media streams, and wherein said value B is a difference between a scheduled playback time of said last played frame of said first media stream of said at least one media streams and a scheduled playback time of said last played frame of said second media stream of said at least one media streams.

5. The method according to claim 1, wherein said jitter-duration metric is contained in a pre-defined set of quality metrics that further contains a quality metric related to a corruption of one out of at least two types of frames contained in said at least one media stream, wherein one out of said at least two types of frames contained in said at least one media stream is a scene cut frame, and wherein said quality metric related to a corruption of one out of at least two types of frames contained in said at least one media stream is a number-of-corrupted-scene-cut-frames metric that is related to a number of corrupted scene cut frames in said at least one media stream.

6. The method according to claim 2, wherein said frame-rate-deviation metric is reported together with a timestamp, and wherein said timestamp is equal to a play time of a first played frame during said deviation relative to a starting time of a quality reporting period.

7. The method according to claim 4, wherein said synchronization-loss-duration metric is reported together with a timestamp, and wherein said timestamp is equal to a play time of a first played frame during said synchronization loss event relative to a starting time of a quality reporting period.

8. The method according to claim 6, wherein said play time is a Normal Play Time NPT.

9. The method according to claim 1, wherein said jitter-duration metric is contained in a pre-defined set of quality metrics that further contains a corruption-duration metric that is related to a duration of a corruption, and wherein said quality feedback value determined according to said corruption-duration metric is only reported if said duration is larger than a pre-defined value.

10. The method according to claim 1, wherein said streaming of said at least one media stream is based on a Real-time Transport Protocol RTP.

11. The method according to claim 1, wherein said streaming is at least partially controlled by a Real-time Streaming Protocol RTSP.

12. The method according to claim 11, wherein said quality feedback value is reported to said server via said RTSP.

13. The method according claim 1, wherein said streaming is performed according to the Packet-switched Streaming Service PSS in a third generation mobile communications system.

14. A non-transitory computer-readable memory having a program product stored therein, the computer program comprising instructions operable to cause a processor to perform the method of claim 1.

15. An apparatus comprising:
means for determining a difference between a playback time of a playback of at least one media stream streamed to said apparatus for playback and a scheduled playback time;
means for comparing said difference between said playback time of said playback of said at least one media stream and said scheduled playback time to a pre-defined value;
means for detecting a jitter event that is considered to occur when said comparing said difference between said playback time of said playback of said at least one media stream and said scheduled playback time to said pre-defined value yields that said difference is larger than said pre-defined value;
means for determining a quality feedback value according to at least one quality metric related to said playback of said at least one media stream, said quality metric being a jitter-duration metric that is related to a duration of said detected jitter event; and
means for reporting said quality feedback value to a server.

16. An apparatus comprising:
means for receiving a quality feedback values reported by a client to said apparatus, the quality feedback value having been determined by
determining a difference between a playback time of a playback of at least one media stream streamed to said client for playback and a scheduled playback time;
comparing said difference between said playback time of said playback of said at least one media stream and said scheduled playback time to a pre-defined value;
detecting a jitter event that is considered to occur when said comparing said difference between said playback time of said playback of said at least one media stream and said scheduled playback time to said pre-defined value yields that said difference is larger than said pre-defined value; and
determining said quality feedback value according to at least one quality metric related to said playback of said at least one media stream, said quality metric being a jitter-duration metric that is related to a duration of said detected jitter event.

17. The method according to claim 1, wherein said play time is a Normal Play Time NPT.

18. The method according to claim 7, wherein said play time is a Normal Play Time NPT.

19. An apparatus comprising:
a monitor configured to
determine a difference between a playback time of a playback of at least one media stream streamed to said apparatus for playback and a scheduled playback time;
compare said difference between said playback time of said playback of said at least one media stream and said scheduled playback time to a pre-defined value;
detect a jitter event that is considered to occur when said comparing said difference between said playback time of said playback of said at least one media stream and said scheduled playback time to said pre-defined value yields that said difference is larger than said pre-defined value;

determine a quality feedback value according to at least one quality metric related to said playback of said at least one media stream, said quality metric being a jitter-duration metric that is related to a duration of said detected jitter event; and a transmitter configured to report said quality feedback value to a server.

20. The apparatus according to claim 19, wherein said play time is a Normal Play Time NPT.

21. The apparatus according to claim 19, wherein said streaming of said at least one media stream is based on a Real-time Transport Protocol RTP.

22. The apparatus according to claim 19, wherein said streaming is at least partially controlled by a Real-time Streaming Protocol RTSP.

23. The apparatus according to claim 22, wherein said quality feedback value is reported to said server via said RTSP.

24. The apparatus according claim 19, wherein said apparatus is a client of the Packet-switched Streaming Service PSS of a third generation mobile communications system.

25. An apparatus comprising:
a receiver configured to receive a quality feedback value reported by a client to said apparatus, the quality feedback value having been determined by
determining a difference between a playback time of a playback of at least one media stream streamed to said client for playback and a scheduled playback time;
comparing said difference between said playback time of said playback of said at least one media stream and said scheduled playback time to a pre-defined value;
detecting a jitter event that is considered to occur when said comparing said difference between said playback time of said playback of said at least one media stream and said scheduled playback time to said pre-defined value yields that said difference is larger than said pre-defined value;
determining said quality feedback value according to at least one quality metric related to said playback of said at least one media stream, said quality metric being a jitter-duration metric that is related to a duration of said detected jitter event.

26. The apparatus according to claim 25, wherein said apparatus is a server of the Packet-switched Streaming Service PSS of a third generation mobile communications system.

* * * * *